Oct. 11, 1949.                    E. A. ACKERMAN                    2,484,796
                   LAMP HAVING A LENS FOR ESTABLISHING
                          AN ANTIGLARE SCREEN
                          Filed Dec. 29, 1945
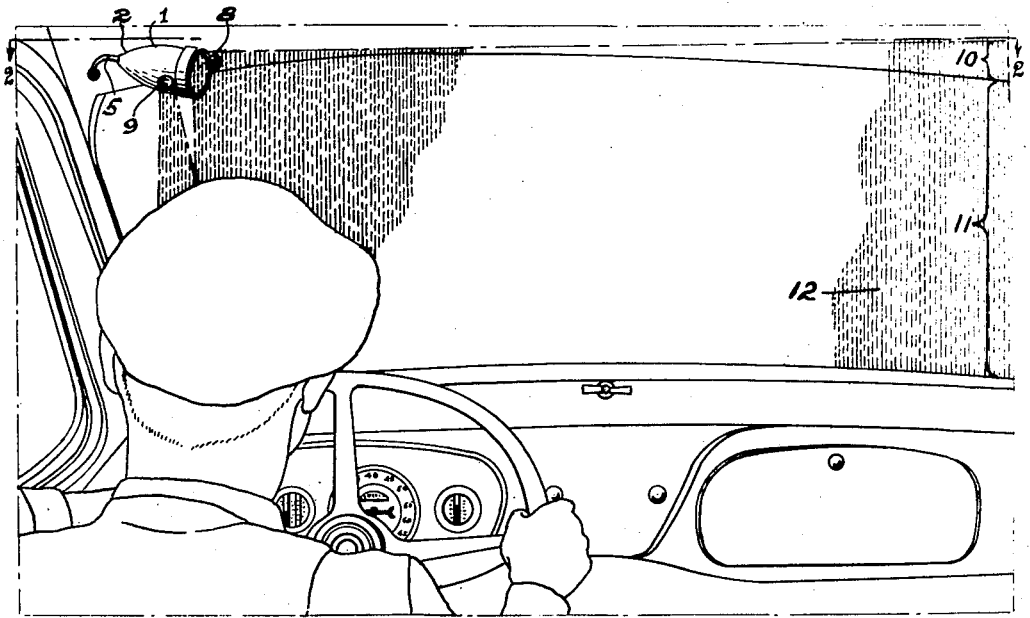
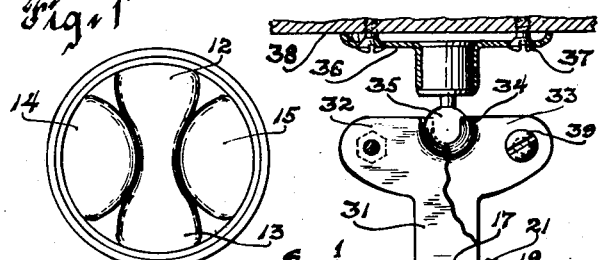
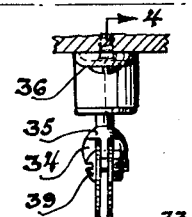
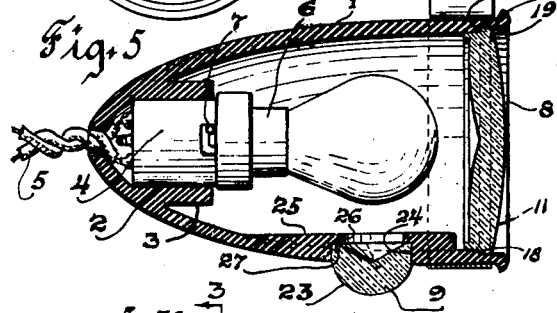
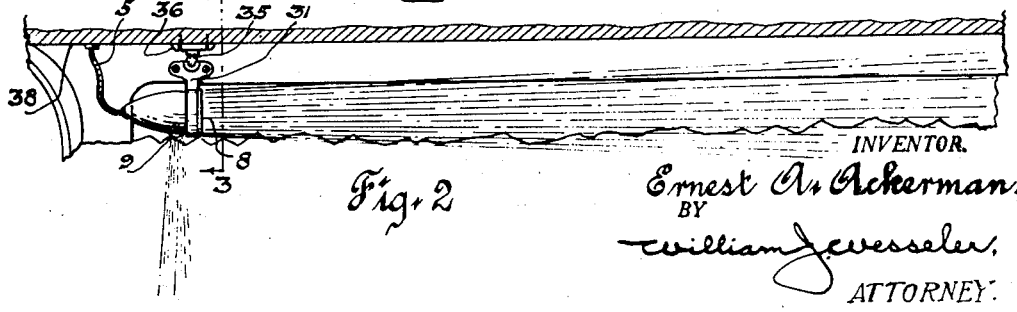
INVENTOR.
Ernest A. Ackerman,
BY
William J. Wesseler,
ATTORNEY.

Patented Oct. 11, 1949

2,484,796

UNITED STATES PATENT OFFICE 2,484,796

LAMP HAVING A LENS FOR ESTABLISHING AN ANTIGLARE SCREEN

Ernest A. Ackerman, Cleveland Heights, Ohio

Application December 29, 1945, Serial No. 638,065

4 Claims. (Cl. 240—7.1)

This invention relates to a glare screen. More particularly it comprises means for utilizing light rays of beneficial characteristics physiologically upon the eye structure which pre-condition the eyes against too great sensitivity to the glare of approaching headlights. The invention also involves the providing of a screen of specialized light over the inner surface of a windshield which serves to reduce the effects of glare.

The invention also includes the use of a light source of rays of a specialized type which are directed into the eyes of the driver of an automobile or other vehicle which has the effect of rendering the eyes less sensitive to the glare of approaching headlights. The invention contemplates the use of the rays directed across the windshield and toward the eyes of the user from a single light source but some of the benefits of the invention may be realized through the use of either one of the glare minimizing elements referred to.

The invention has no harmful effect on the organs of vision but relieves eyestrain and nerve strain caused by glare due to the headlights on approaching vehicle when driving at night and tends to relieve discomfort or confusion on the part of the driver without in any way reducing or restricting his capacity to see all sides of the road at all times.

The invention does not produce the effect of a reduction of vision for the reason that the elements utilized do not reduce the amount of light transmitted from the headlights of the approaching vehicles.

The invention includes means for providing an area of colored light through which glare producing rays from the aproaching headlights must pass before they reach the eyes of the driver. The invention also includes the use of rays of a beneficial character directed into the eyes of the driver and combined with the use of an area of rays of beneficial character directed against the inner surface of a windshield intermediate the source of glare and the position of the driver. The principal object of the invention is to provide means for reducing the effects of glare of approaching headlights without utilizing or interposing screens of a character to reduce road vision from the position of the driver.

Another object of the invention is to provide a screen formed of a light of a beneficial character and of relatively narrow width projected against the inner surface of the windshield through which the glare of approaching headlights must pass and which has the effect of preventing impairment of vision on the part of the driver.

Another object of the invention is to provide means for projecting a small beam of beneficial rays from a light source to the eyes of a driver of an automobile which will prevent reduction of the driver's accommodation to the rays from approaching headlights.

Another object of the invention is to provide a means for reducing glare through the use of an area of a light projected against the inner surfaces of the windshield of an automobile and having characteristics which do not affect the organs of vision.

Another object of the invention is to provide a means for reducing glare which comprises directing rays from a light source toward the eyes of the driver having a protective action upon the organs of vision and providing for free accommodation of the eyes to the approaching headlights and full capacity to observe the highway.

Another object of the invention is to provide a means for protecting the driver of an automobile against the effect of glare which includes the projecting of light rays toward the eyes of the driver and projecting separate light rays over the windshield through which the light from the approaching headlights must pass toward the eyes of the driver.

Other and further objects of the invention will appear in the course of the following description.

The annexed drawing and the following description set forth in detail certain structure embodying the invention and method of using the same, such disclosed means constituting, however, but several of various structural forms and methods of using the same, in which the principle of the invention may be used.

In said annexed drawing:

Figure 1 is a perspective view showing a device embodying the principles of the invention in an operative position adjacent the windshield of an automobile;

Figure 2 is a top plan view partly in section taken along the line 2—2 shown in Figure 1, looking in the direction of the arrow;

Figure 3 is a front elevation of the lamp casing and bracket as seen along the line 3—3 shown in Figure 2;

Figure 4 is a view partly in section taken along the line 4—4 shown in Figure 3, looking in the direction of the arrows; and Figure 5 is a diagrammatic view showing the inner-face of the projecting lens.

As is clearly shown in the drawing, the apparatus embodying the invention comprises the casing 1 preferably formed of plastic material such as Bakelite or the like, of elongated cylindrical shape tapering to a semi-spherical end portion 2 preferably provided with an integral socket 3 within which is firmly engaged an electric bulb socket 4 connected with an electric circuit cable means 5 entering through an aperture in the rear end of the casing 1. A miniature electric bulb 6, preferably having a bayonet joint 7, is engaged in the socket 4 and provides a light source of sufficient intensity to project adequate light through a special type of lens 8 at the front of the casing and through a bull's-eye 9 in the side of the casing. Both the lens and the bull's-eye are formed of glass having adequate chemical compounds mixed with its composition to provide light rays of purplish color.

The lens 8 preferably is formed with a convex outer surface 11 and with its inner surface formed of four flattened areas 12, 13, 14 and 15, of lenticular shape. The first areas 12 and 13 are preferably narrower than the flat areas 14 and 15, and are arranged in somewhat hourglass shape in a vertical position, whereas the flattened areas 14 and 15 are arranged transversely of the lens when it is in adjusted position. This arrangement results in the projection of a beam of light of relatively narrow width transversely as shown at 10, Fig. 1 and of broad width vertically as shown at 11 in Fig. 1. Thus, a large portion of the inner surface of the windshield is continuously contacted by an area of colored light as shown by the fine cross-hatched lines 12 in Fig. 1 having a very soothing effect on the eyes of the driver and of a high degree of effectiveness in reducing the glare caused by approaching headlights of an automobile. The lens 8 is formed with a reduced rearward section 16 seating within the front inner surface of the casing, the shoulder 17 of the lens bearing against a shoulder 18 formed by the countersunk recess 19 provided at the open end of the casing. A projecting bead 21 may be provided around the front edge of the casing to strengthen the same and provide a predetermined degree of resiliency at such a point whereby the lens may be held in position by means of a friction fit. The lens 8 is normally held in position by firmly pressing the same inwardly against the resiliency of the casing, whereby it will be firmly held when it is snapped into seated position against the shoulder 18. In order to readily remove the lens a notch 22 is provided in the margin of the casing and the lens may be thus engaged by a pointed implement and readily removed.

It will be noted that the lens is of the smallest diameter at a central point and thus by reason of the hour-glass shape of the narrow vertically positioned flattened areas, that a beam exactly suited for the most effective utilization of the light rays as a glare screen is provided.

The bull's-eye lens 9 is set at the side of the casing and slightly at a downwardly inclined angle as shown in Figures 1 and 3, and as stated is preferably formed of a glass adapted to project colored rays. The bull's-eye has an outer face 23 of semi-spherical shape and preferably has an inner concave face 24 defining a flattened cone. The casing is preferably formed with a thickened area 25 at the point of support for the bull's-eye, such area being flat on its upper surface and having an aperture 26 which is enlarged outwardly to provide a shoulder 27 against which the bull's-eye is held by frictional engagement. The lamp casing may be supported by any suitable means adjacent the windshield, that shown comprising a metal strap 31 extending around the casing adjacent its forward end and having each of its extreme outer ends formed with lateral wing portions 32, 33, and centrally notched and shaped to provide a spherical recess 34 adapted to engage a terminal ball 35 projecting from a bracket plate 36 preferably in the form of a sheet metal stamping and secured by screws 37 or other suitable means to the frame of the windshield 38 or other suitable point of support. The spherical recess 34 has a frictional engagement with the ball 35 and bolts 39 are provided in each of the wing portions of the bracket and which permit the increasing of the frictional engagement of the spherical recess with the supporting ball 35.

The apparatus just described utilizes the light source both to flood the inner surface of the windshield with rays of a soothing, beneficial effect on the eyes of the driver and with rays which serve to reduce the glare from approaching headlights and also to provide a light directed toward the eyes of the driver. The method involved in the invention includes the steps of reducing the effects of glare on the eyes of an automobile driver by providing a source of light to emit light rays and projecting such rays in a direction to intercept the rays projected from approaching headlights. The method also includes the use of a pencil of colored rays from a bull's-eye projected as a small, concentrated beam toward the eyes of the driver so as to provide for free accommodation of the driver's eyes to road conditions, irrespective of the approaching headlights.

The method also includes the use of both the area of rays adjacent the windshield and the pencil of rays projected toward the eyes of the driver simultaneously so as to greatly increase the protective effect of the light rays.

Other modes of applying the principle of my invention may be employed instead of the one explained, change being made as regards the means herein disclosed, provided those stated by any one of the following claims or their equivalents be employed.

I therefore particularly point out and distinctly claim as my invention:

1. In an apparatus for reducing glare, the combination with the windshield of a vehicle, of a casing interiorly mounting a lamp adapted to be connected with a source of electric current supply said casing having an open end supporting a purple colored lens through which rays emitted by the lamp are projected, means on the inner side of the vehicle for supporting said casing above and at one side of the line of vision of a driver toward an approaching vehicle and in position to support said lens at right angles to said windshield to direct the light rays projected therefrom transversely of and substantially parallel to the inner side of said windshield in advance of the driver, and a bull's-eye consisting of a purple colored lens mounted in the lower portion of the side wall of said casing for simultaneously directing a portion of the light rays emitted by the lamp downwardly at substantially right angles to the rays projected by said first mentioned lens toward the eyes of the driver.

2. In an apparatus for reducing glare, the combination with the windshield of a vehicle, of a casing interiorly mounting a lamp adapted to be connected with a source of electric current supply, said casing having an open end supporting a purple colored lens through which rays emitted by the lamp are projected, means on the inner side of the vehicle for supporting said casing above and at one side of the line of vision of a driver toward an approaching vehicle and in position to project light rays from said lens transversely of and substantially parallel to the inner side of said windshield in advance of the driver, and a bull's-eye consisting of a purple colored lens mounted in the lower portion of the side wall of said casing for simultaneously directing a portion of the light rays emitted by the lamp toward the eyes of the driver, the inner face of said first mentioned lens having substantially radially disposed flattened surfaces meeting centrally at a point of reduced thickness to provide a zone of light rays of shallow depth in projected relation to the inner surface of said windshield, whereby the light rays from the headlights on an approaching vehicle will have to pass through the zone of projected light rays before reaching the eyes of the driver.

3. An apparatus as claimed in claim 2 wherein the flattened surfaces of said first mentioned lens consist of areas of narrow width positioned diametrically in a vertical direction and areas of broad width positioned diametrically horizontally.

4. In an apparatus for reducing glare, the combination with the windshield of a vehicle, of a casing interiorly mounting a lamp adapted to be connected with a source of electric current supply, said casing having an open end supporting a purple colored lens through which rays emitted by the lamp are projected, means on the inner side of the vehicle for supporting said casing above and at one side of the line of vision of a driver toward an approaching vehicle and in position to project light rays from said lens transversely of and substantially parallel to the inner side of said windshield in advance of the driver, and a bull's-eye consisting of a lens mounted in the lower portion of the side wall of said casing for simultaneously directing a portion of the light rays emitted by the lamp toward the eyes of the driver, the inner face of said first mentioned lens having substantially radially disposed flattened surfaces meeting centrally at a point of reduced thickness to provide a zone of light rays of shallow depth in projected relation to the inner surface of said windshield, whereby the light rays from the headlights on an approaching vehicle will have to pass through the zone of projected light rays before reaching the eyes of the driver.

ERNEST A. ACKERMAN.

REFERENCES CITED

The following references are of record in the file of this patent:

UNITED STATES PATENTS

| Number | Name | Date |
| --- | --- | --- |
| 1,424,047 | Svedahl | July 25, 1922 |
| 1,544,973 | Ghadiali | July 7, 1925 |
| 1,903,462 | Knox | Apr. 11, 1933 |
| 1,929,298 | Wessels | Oct. 3, 1933 |
| 2,057,983 | Spitler et al. | Oct. 20, 1936 |
| 2,062,512 | Hine | Dec. 1, 1936 |

FOREIGN PATENTS

| Number | Country | Date |
| --- | --- | --- |
| 324,837 | Great Britain (Gale) | Feb. 6, 1930 |

OTHER REFERENCES

Holladay, article in Journal Opt. Soc. of Am., vol. 12, April 1926, pages 271, 273, 285, 291, 292 and 307.

Zoethout Text Physiological Optics, publ. Professional Press, Chicago, 1927, page 149.